United States Patent Office 3,262,990
Patented July 26, 1966

3,262,990
FULVENE-CONTAINING UNSATURATED
POLYESTER RESINS
Marvin J. Hurwitz, Elkins Park, Pa., and Donald M. Fenton, Anaheim, Calif., assignors to Rohm & Haas Company, Philadelphia, Pa., a corporation of Delaware
No Drawing. Filed Oct. 11, 1963, Ser. No. 315,661
19 Claims. (Cl. 260—861)

This invention deals with fulvenes, fulvene-containing resins and fulvene plastics.

The plastic industry has attempted to keep up with the challenge imposed by the opening up of new fields of endeavor and by broad extension in areas where generally more conventional materials had been relied upon. These developments, together with a general need to meet stricter and higher standards, have pointed out serious shortcomings in conventional resins. This has become particularly apparent in the field of unsaturated polyester resins cross-linked and thermoset with a polymerizable compound, such as one containing a

group. A very serious problem confronting this area of the plastic industry is the extreme shrinkage experienced during the conversion of the polyester resin to the cross-linked plastic. During the curing cycle, when the plastic material is being formed by the cross-linking occurring between the unsaturated component in the linear polyester and the monomer having a

group, a shrinkage in the over-all dimensions of the plastic occurs which sometimes is as high as 10%. This is, of course, a very objectionable characteristic. This shrinkage causes objectionable stresses and strains within the plastic. These, in turn, tend to lead to the formation of cracks and creases, and breaks in the plastic structure. On the surface, such imperfections would be noticeable and the exposed surfaces of the plastic may lose their gloss and shine. As another attendant drawback, the plastics then show a decrease in resistance to solvent impregnability. Internally, shrinkage also has serious consequences. The poor dimensional stability of such resins promotes weakening of the resins, lowering their rigidity and their flexural strengths. As binders of laminated articles and in glass-reinforced plastics, poor dimensional stability lowers adhesion properties.

To these vexing problems, even the more astute workers in the art have not yet proposed an adequate and satisfactory solution.

The present invention provides new polymerizable polyester resins and polymerized cross-linked plastics of remarkable dimensional stability.

The polymerizable resinous compositions are a blend of an unsaturated polyester and a fulvene compound, chemically combined, in a Diels-Alder type addition, with the unsaturated component of the polyester. The polymerized composition is a cross-linked insoluble, infusible plastic of the polyester and the fulvene. The compositions exhibit minimal shrinkage and excellent dimensional stability. As a result, the invention provides plastics having a novel combination of advantageous properties. The plastics of the invention have increased strength properties because the volumes of high energy density, which occur in volumes contained in the stressed, conventional molecules of the polyester plastics, are minimized. The plastics of the invention provide for more homogeneously cast or constructed parts; therefore, they exhibit a minimum of surface stress with resulting minimum of crazing and cracking. Because fewer active sites for initiating deterioration and breakdown are available in the plastics of the invention, the products tend to be more resistant to hydrolytic, solvolytic and ultraviolet breakdown. In laminating and glass-reinforced plastic applications, the resins of the invention provide improved wetting of the surfaces of the materials treated and, therefore, they have better adhesive properties. The resins of the invention open new vistas to fabricators making it possible for them to set closer tolerances on the dimensions of their plastic finished products, making possible, for instance, the design and manufacture of plastic materials of more complicated design with narrow and/or thin dimensions.

The present invention provides a number of notable embodiments. One embodiment comprises a stable, yet polymerizable, resinous mixture of linear polyester with a fulvene, a potential cross-linker, which is in a Diels-Alder type of chemical combination with at least one of the ethylenic bonds in the unsaturated polyester backbone. One type of resinous mixture is substantially free of ethylenic unsaturation in the polyester backbone as a consequence of the fact that the fulvene is at least in equimolar proportion with the unsaturated component in the polyester. The fulvene component may be in excess of the unsaturated component of the polyester. In other types of resins, the proportion of fulvene is less than equimolar with respect to the unsaturated component of the polyester.

In such a case, the polyester resin is unsaturated to the extent of the molar difference between the unsaturated component of the polyester and the fulvene component. The resin is a useful composition of a viscous nature which is stable over extended periods of storage. Unlike conventional compositions of solutions of polyesters in copolymerizable ethylenically unsaturated compounds such as styrene, the resins of the invention do not need any inhibitor; although they already comprise, in the fulvene component, the potential copolymerizable cross-linker.

Another embodiment of the invention provides compositions comprising a polyester and a fulvene polymerized and cross-linked into an infusible and insoluble plastic.

An aspect of the above embodiment is directed to a method for converting the Diels-Alder type resinous adduct product to the cross-linked, polymerized plastic which comprises heating the resin to within a temperature range within which cross-linking between the fulvene and the unsaturated portions of the linear polyester occurs and below that at which the interpolymerization of the fulvene will take precedence over the cross-linking reaction. The conversion of the stable resin into the cross-linked plastic apparently goes through an intermediate stage during which a reversal of the Diels-Alder type adduct to the fulvene and the unsaturated polyester component takes place by a temporary dissociation of these components. The dissociation is apparently followed by a rearrangement of the bonds of the various components so that a cross-linked plastic product results in which two of the double bonds of the fulvene are cross-linked with the unsaturated components of the polyester backbone chain.

These features are quite unusual because in conventional resins which form Diels-Alder type resinous adducts, such as the "Knapp" resins or their equivalent, no such dissociation is known to take place, and even if it were to take place, the dissociated components are incapable of cross-linking without the incorporation of a conventional cross-linker such as styrene.

Another embodiment of the invention provides for a new class of fulvenes which are especially useful in the resins and the plastic composition of the invention. A related aspect concerns a method for making these fulvenes by a condensation involving a compound bearing at least one carbonyl, C=O, group with a cyclopentadiene component, in the presence of a basic catalyst. Another related useful aspect of the invention provides stable Diels-Alder adducts, simple di-Diels-Alder and poly-Diels-Alder adducts, of these fulvenes and suitable dienophiles. Another aspect of the invention provides useful polymers, i.e. the homopolymers of these fulvenes and their copolymers with copolymerizable ethylenically unsaturated comonomers. These and other related embodiments are further described herein.

The fulvenes which may be employed in accordance with this invention may be represented by the formula

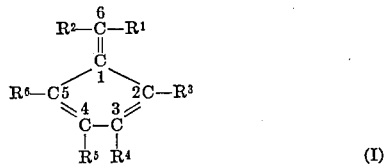

(I)

In the nomenclature of these fulvenes, the carbon atoms are numbered as shown. For clarity, the fulvenes are considered as made up of two portions: (1) a cyclopentadienylidene portion which comprises carbons numbered 1 to 5 and groups $R^3$ to $R^6$, and (2) a portion which includes carbons numbered 6 and $R^1$ and $R^2$

and which is herein designated as exocyclic because it is outside of the ring of carbon atoms numbered 1 to 5. This second portion of the fulvene is derived from a carbonyl, C=O residue, i.e., it is a ketone or an aldehyde containing at least one carbonyl group free of its oxo, O=, oxygen. Either one or both of $R^1$ and $R^2$ may be linked to $R^3$ and/or $R^6$ to form one or more cycles. This may arise when the second portion (2) contains more than one as two, three, or four, or more carbonyl residues.

A preferred method for making the fulvenes which are employed in this invention is a method which is further described below which comprises a condensation of a cyclopentadiene, or its equivalent, with an oxo-carrying compound, such as an aldehyde or a ketone.

In Formula I, (1) $R^1$ and $R^2$, selected individually, is a hydrogen atom or a hydrocarbon group which may, optionally, be substituted with inert, non-interfering substituents. Typical hydrocarbon groups are alkyl, aryl, alkaryl, and aralkyl;

(2) $R^3$ to $R^6$, selected individually, represent a hydrogen atom and/or $R^3$ to $R^6$ is a hydrocarbon group which may be in part or in toto substituted with non-interfering substituents, such as alkyl, alkenyl, aryl, alkoxy, carboxyl, halogens and the like. Generally, the total carbon atom content of these substituents does not exceed 12 to 20;

(3) One of $R^1$ and $R^2$ is a hydrogen atom or a hydrocarbon group defined under (1) and especially an alkyl group, while the other of $R^1$ and $R^2$ is linked with one of $R^3$ and $R^6$ to form a divalent alkylene chain, which together with the carbon atoms of the cyclopentadienylidene portion, forms a cycloalkylene ring, generally containing 4 to 10 carbon atoms in the ring. The ring may be further substituted with alkyl substituents.

A further embodiment of the invention deals with a special group of fulvenes which may be represented by the formula

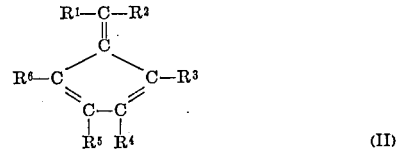

(II)

In a first group (1), among these special fulvenes, one of the substituents $R^1$ and $R^2$ is a hydrogen atom and the other of $R^1$ and $R^2$ is an alkyl group. Of special interest are those fulvenes in which the alkyl group is branched and especially those in which the alkyl group is alkyl-substituted on its carbon atom. More readily available are those fulvenes in which the alkyl group contains no more than 12 carbon atoms and the α-substituent is methyl. The fulvenes of this first group may optionally have further substituents on the cyclopentadiene component. Of special interest are those in which the optional substituent is an alkyl or an alkenyl group, especially a branched alkenyl group, such as an alkenyl group substituted by an alkyl group as its α-carbon atom. More readily available are those fulvenes in which the alkenyl or alkyl substituents contain a maximum of 12 carbon atoms. Still within the first group are included those fulvenes in which one of $R^1$ and $R^2$ is a cycloalkenyl group, generally containing 5 to 7 carbon atoms in the ring, which, optionally, may carry alkyl substituents to form a cycloalkenyl grouping containing a total of 12 carbon atoms.

In a second group of fulvenes (2), while both $R^1$ and $R^2$ are an aryl group of 6 to 14 carbon atoms, the cyclopentadiene component of the fulvene carries a branched alkenyl group, generally not exceeding a content of 8 carbon atoms.

In a third group of fulvenes (3), $R^1$ and/or $R^2$ is an alkenyl group, straight or branched, with ethylenic unsaturation located terminally. Generally, the carbon content of each $R^1$ and $R^2$ is a maximum of 18 carbon atoms.

In a fourth group of fulvenes (4), one of $R^1$ and $R^2$ is a hydrogen atom and the other of $R^1$ and $R^2$ is linked with one of $R^3$ and $R^6$ to form a cycloalkenyl carbocycle. The cycloalkenyl chain may contain 2 to 6 carbon atoms or more, and it may, optionally, be substituted with further alkyl substituents, generally having not more than 4 carbon atoms.

This special class of fulvenes is characterized by a number of valuable properties. When the 6-carbon atom of the fulvene is substituted with only one α-branched alkyl group, the reactivity of the fulvene appears to be optimum in the formation of the Diels-Alder adducts and in the polymerization reactions. This advantage appears further enhanced and was reflected in the polyester cross-linked products when these fulvenes possess alkyl, and especially branched alkenyl, substitution on the cyclopentadienylidene portion. When the fulvenes have alkenyl with a terminal vinyl group on the cyclopentadiene portion and substitution free of acetylenic unsaturation on the sixth carbon atom, they appear more reactive in polymerization reactions with the attendant advantage of shorter curing cycle in the formation of the cross-linked fulvene plastic. When the fulvenes are disubstituted on the sixth carbon atom with an alkenyl group having vinyl unsaturation, again unexpected advantages are obtained in the plastic product. The polycyclic fulvenes in which the substitution on the sixth carbon atoms forms one or more rings by linking with one or more carbon atoms of the cyclopentadienylidene portion also appear to confer further advantages in the final resinous and plastic products.

Typical of these fulvenes are the following: 6-α-methylbutyl fulvene, 6-α-methylhexyl fulvene, 6-α-methyldodecyl fulvene, 6-isopropyl fulvene, 6-cyclohex-9-enyl fulvene, 6-cyclohex-8-enyl fulvene, 6-cyclopent-7-enyl fulvene, 6-cyclohept-8-enyl fulvene, 6-cyclo-(2-methyl) hex-9-enyl fulvene, 3-(β'-methyl-α'-pentenyl)-6-methylbutyl fulvene, 3-(β'-ethyl-α'-hexenyl)-6-α-methylhexyl fulvene, 3-isopropenyl-6,6-diphenyl fulvene, 3-isopropenyl-6,6-xylyl fulvene, 3-isopropenyl-6,6-dinaphthyl fulvene, 3-isobutenyl-6,6-diphenyl fulvene, 3-(α-methyl)-butenyl-6-diphenyl fulvene, 6,6-di(α-butenyl)fulvene, 6,6-divinyl fulvene, 6,6-diisopropenyl fulvene, 6,6-(α-hexenyl) fulvene, 6-methyl-6-(α-butenyl)fulvene, 6-methyl-6-vinyl fulvene, 6,7-dihydroazulene, and the corresponding bicyclic fulvenes from succinaldehyde, adipaldehyde.

The fulvenes of the invention are prepared by a method which comprises reacting a compound carrying at least one carbonyl group, C=O, and which may be represented by the formula

(III)

with a cyclopentadiene portion

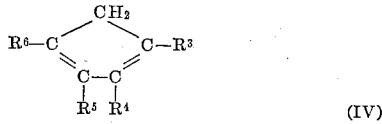

(IV)

preferably in the presence of a catalytic amount of a base.

Typical of the carbonyl-carrying compounds are the following carbonyl compounds:

wherein R is a straight chain or branched alkyl group, an aryl group, an alkaryl group, or an aralkyl group, preferably containing 1 to 18 carbon atoms. Typical are the following: acetaldehyde, propionaldehyde, n-butyraldehyde, isobutyraldehyde, n-valeraldehyde, isovaleraldehyde, n-caproaldehyde, n-heptaldehyde, stearaldehyde, cinnamaldehyde, p-tolualdehyde, and other substituted aldehydes, such as o-chlorobenzaldehyde, m-nitrobenzaldehyde, 2-nitro-3,4,5-trimethoxybenzaldehyde, and the like.

Typical other carbonyl-carrying compounds are the carbonyl compounds of the formula

wherein $R^1$ and $R^2$, selected independently, are alkyl, aryl, alkaryl, or aralkyl groups, preferably containing from 1 to 18 carbon atoms. Typical are the following: acetone, methyl ethyl ketone, methyl n-propyl ketone, diethyl ketone, hexanone-2, hexanone-3, methyl t-butyl ketone, di-n-propyl ketone, diisopropyl ketone, diisobutyl ketone, di-n-amyl ketone, stearone, diacetyl, acetylacetone, mesityl oxide, phorone, cyclohexanone, benzophenone methyl propyl ketone, methyl hexyl ketone, methyl isopropyl ketone, methyl isobutyl ketone, methyl dodecyl ketone, methyl allyl ketone, methyl methallyl ketone, acetophenone, civetone, exaltone, p-nitroacetophenone, m-chloroacetophenone, p-isopropylacetophenone, p,t-octylacetophenone, 2-acetylphenanthrene, 2-acetyl-1-naphthol, 1 - acetonaphthone, 2 - hydroxycyclohexanone, cyclopentanone, cycloheptanone, p,t-butylcyclohexanone, m - isopropylcyclohexanone, 3 - methylcyclopentanone, α-hydrindone, β-hydrindone, α-tetralone, β - tetralone, 6 - methoxy - α - tetralone, p - methoxyacetophenone, 4-butoxycarbonylcyclohexanone, 4-methoxycyclohexanone, 4-hydroxycyclohexanone, n-aminoacetophenone, p-dimethylaminoacetophenone, 2-trifluoromethylacetophenone, p-methoxyacetophenone, methyl levulinate, butyl levulinate, ethyl β-methyllevulinate, 1- hydrindone, 1-tetralone, and pinacolone. Also, there may be used ethyl acetoacetate mesitononitrile and the like.

The ketone-carrying compound is reacted with a compound (IV) which is the cyclopentadiene portion of the fulvene. Typical of such cyclopentadienylidene residues are the following dienes: cyclopentadiene, 1,5,5-trimethyl-1,3-cyclopentadiene, 1-benzyl-1,3-cyclopentadiene, 2-benzyl-1,3-cyclopentadiene, 1,4-diphenyl-1,3-cyclopentadiene, 1-phenyl-4-p-tolyl-1,3-cyclopentadiene, 1-carbomethoxy-4,5-dimethyl-1,3-cyclopentadiene and 2-carbomethoxy-1,5-dimethyl-1,3-cyclopentadiene.

The cyclopentadiene residue of the fulvene and an appropriate dienophile enter into a Diels-Alder reaction. Such reactions are well known and are described in Organic Reactions, vol. 4, page 60, for instance.

The temperature at which the reaction between the keto-carrying compound III and the cyclopentadiene compound is carried out is not critical.

The reaction is generally exothermic with some variations in the degree of exotherm generated being observed with different carbonyl compounds. As an overall range, about −20° to about 90° C. is suitable. However, with the aldehydes, the reaction appears to be more vigorous and, for best yields, it may be preferable to apply means for moderating it.

For example, cooling means may be used when necessary to preferably keep the temperature in the range of 20° to 40° C. for the substituted aldehydes and in the range of −20° to 10° C. for the straight chain aldehydes.

The carbonyl compounds which are useful in the preparation of the fulvenes may have a single or a plurality of formyl or carbonyl functions; the compounds may have both formyl and keto functions; they may be substituted with other functional groups, inert in the present reactions. In the case of the ketones, their somewhat more sluggish reaction may be accelerated by applying heating or equivalent means to maintain the temperature in the preferred range of about 30° to 60° C. To favor best yields, it is advisable to keep the reaction temperature below the temperature at which the fulvenes will polymerize with themselves. This reaction, which would be competing with the formation of the fulvenes, is generally adequately minimized by maintaining the temperature below 120° C., preferably below 90° C., for the more reactive fulvenes. The order of addition of the compounds III and IV is not critical, but it is preferable to add the keto compound II to a mixture of the cyclopentadiene portion IV and the base catalyst in order to minimize the formation of by-products that could occur in the situation where an aldehyde or a ketone and a base are pre-mixed. A solvent may be used, if desired, to facilitate handling the reactants, especially where one of them is not a liquid. Solvents that may be used include organic, inert solvents such as: oxygen containing solvents like ethers, acyclic or cyclic, as dimethyl ether, di-n-propyl ether, tetrahydrofuran, di-n-amylether, water, alcohols, aliphatic or aromatic, as methyl, ethyl, propyl, t-aryl, benzyl alcohols, and the like.

Theory requires a stoichiometric amount of reactants II and IV. But, if desired, there may be employed an excess of keto compound II such as a 10 to 100 mole percent excess.

Any base may be employed to catalyze the reaction between II and IV. Any amount that promotes the speed of the reaction is adequate for the purpose. Such a catalytic amount may be a trace, such as 0.01% per mole of reactant, or there may be used amounts as high as 0.25 to 1% or more. Advisably, the amount of catalyst is adjusted to the reactivity of the reactant II to give a speedy, yet controllable, reaction.

The reaction between the carbonyl-carrying compound and the cyclopentadienylidene residue is carried out in the presence of a base. Typical bases that may be employed are the following: alkali metals and the alkaline earth metals, such as lithium, sodium, potassium, strontium, barium, and calcium; alkali metal hydroxides, such as sodium hydroxide, potassium hydroxide; their oxides such as lithium oxide, sodium oxide, and potassium oxide; alkali metal lower alkoxides such as lithium butoxide, sodium methoxide, potassium t-butoxide, and potassium ethoxide; alkali metal hydrides, such as sodium hydride and potassium hydride; alkali metal amides such as sodium amide, lithium amide, potassium amide; alkali metal lower alkyls, alkenyls and alkynyls, such as methyl lithium, ethyl sodium, butyl potassium, allyl sodium, and butenyl potassium; phenylakyl alkali metals such as benzyl sodium, phenylisopropyl potassium, sodium phenylacetylide and alkali metal aromatic such as phenyl sodium, phenyl lithium and phenyl potassium, phenyl butyl sodium; "Alfin" catalysts, which are commercial mixtures of alkali metal alkenyls and alkali metal alkenoxides, such as allyl sodium with sodium allyloxide and butenyl potassium with sodium butenyloxide, and quaternary ammonium bases such as trimethylbenzylammonium hydroxide and dimethyldibenzylammonium hydroxide and the corresponding alkoxides, such as trimethylbenzylammonium butoxide, choline methoxide, and the like.

Other embodiments of this invention are the Diels-Alder adducts of the fulvene with suitable dienophiles. Any dienophile is suitable for forming the adduct. Following the general pattern of the reaction, the dienophile will add across the 1,4-position of the conjugated diene system of the fulvene. A great variety of dienophiles are suitable for the formation of the adducts. For the formation of simple Diels-Alder adducts, the fulvene and the dienophile are used in equimolar proportions. The double Diels-Alder adducts are obtained from 2 moles of fulvene for each mole of dienophile.

The Diels-Alder adducts are prepared by reacting the fulvene with a dienophile. Generally, the reaction is carried out at room temperature; that is, in the range of 20° to 50° C., but it may be carried out in the range from about 0° C. to 200° C. with suitable adjustments in the reactivity of the respective reactants. If desired, an inert solvent, such as aromatic or paraffinic hydrocarbons, such as benzene or isooctane or ethers such as tetrahydrofuran may be employed to dissolve the reactants and/or to moderate the reaction. Under such conditions, a quantitative yield of the adduct often separates from the solution in nearly pure form. Adducts of the lesser reactive dienes and fulvenes form adducts when solutions of the components are refluxed at elevated temperatures.

Typical dienophiles include the following: maleic anhydride, methyl acrylate, butyl acrylate, methyl methacrylate, and other acrylates and methacrylates; also dimethyl acetylene dicarboxylate, dimethyl fumarate, dioctyl fumarate, methacrylic acid, acrylic acid, fumaric acid, dimethyl maleate, dimethyl fumarate, diisobutyl maleate, fumaryl chloride, citraconic anhydride, methyl fumaric acid, and other similar dienes.

The adducts of the fulvenes and the dienophiles are free-flowing liquids or solids which are non-polymeric. They are useful in the formation of polyester resins along with or separately from the fulvene monomers. The Diels-Alder adducts of the invention are of particular value in decreasing the viscosity of the polymeric fulvene resin by blending the adduct, in any desired proportion, with the polyester resin. Ideally, the constituents of the adduct are so selected that the decomposition of the Diels-Alder adduct and the copolymerization of the resulting diene and dienophile occur at about the same temperature, or within a temperature range of 10° C. of each other, as the similar reactions of the Diels-Alder adduct of the fulvene and the unsaturated polyester occur.

Another embodiment of the invention provides polymers and copolymers of the fulvenes, the Diels-Alder adducts, of the invention. Polymerization (homopolymerization and copolymerization with other monoethylenically unsaturated polymerizable compounds) of the fulvene is preferably effectuated in the presence of a free radical catalyst or initiator.

As useful unsaturated compounds for forming the copolymers there may be used acrylic acid, methacrylic acid, esters of acrylic acid or methacrylic acid and monohydric alcohols such as methyl, ethyl, butyl, octyl, dodecyl, cyclohexyl, allyl, methallyl, undecenyl, cyanoethyl, dimethylaminoethyl, and the like; esters of itaconic acid and similar alcohols; esters from maleic, fumaric or citraconic acids, and likewise similar alcohols; vinyl esters of carboxylic acids such as acetic, propionic, butyric, and the like; vinyloxyalkyl esters such as vinyloxyethyl acetate; vinyl ethers such as ethyl vinyl ether, butyl vinyl ether, octyl vinyl ether, allyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamide, and N-substituted amides of these types; vinyl chloride, vinyl bromide, vinylidene chloride, 1-chloro-1-fluoroethylene, or ethylene; 1-acetoxy-1,3-butadiene; styrene, or divinylbenzene; ethylene diacrylate or dimethacrylate, bis-(vinoxyethyl)urea, vinoxyethyl acrylate, vinoxypropyl acrylate. Where two polymerizable vinyldiene groups occur in the same molecule, as in compounds toward the end of the above list, cross-linking results where more than one to two percent thereof is used in forming the copolymer.

In accordance with the invention, the unsaturated polyester component of the blend of the unsaturated polyester and the fulvene and of the polymerized cross-linked composition is any type of polyester of the unsaturated type. The constituent of the particular unsaturated polyester is immaterial. Numerous references are found in the literature (such as in "Polymer Processes," vol. X, chapter 17, and "Polyesters and their Applications" by Bjorksten, Reinhold, 1956, and in patent references. Illustrative examples of the components which may be used in the preparation of the unsaturated polyester component which is used in conjunction with the fulvene of the invention, the following acids, alcohols, and mixture of acids, are illustrative.

Aliphatic polyhydric alcohols: ethylene glycol, propylene glycol, trimethylene glycol, triethylene glycol, pentaethylene glycol, polyethylene glycol, 1,4 butanediol, diethylene glycol, dipropylene glycol, 2,2-dimethyl-1,3-propanediol, hexamethylene glycol.

Aromatic polyhydric alcohols: xylene alcohols, ethyl resorcinol, propyl resorcinol, 2-4-dimethyl resorcinol, 3,6-dimethyl-1,2,4-benzenetriol, ethyl pyrogallol, 2-methyl-1,4-dihydroxy naphthalene, 3-methyl-1,4,5-naphthalenetriol, dimethylol toluene, dimethylol xylene, bis hydroxy ethyl or bis hydroxy propyl ethers of resorcinol, catechol, hydroquinone, 1-5-dihydroxynaphthalene, 4,4-isopropylidene bisphenol, etc.

Unsaturated dibasic acids and anhydrides: maleic acid, ethyl maleic acid, maleic anhydride, citraconic acid, muconic acid, fumaric acid, aconitic acid, mesaconic acid, itaconic acid.

Saturated diabasic acids: adipic acid, azelaic acid, sebacic acid, dodecyl succinic acid, succinic acid, tetrachlorophthalic anhydride, hexahydrophthalic anhydride, 1,4,5,6,7,7 - hexachlorobicyclo(2.2.1) - 5-heptane-2,3-dicarboxylic anhydride, malic acid and citric acid.

In addition to the foregoing diabasic acids and anhydrides, phthalic anhydride may be also employed. The polyesters preferred in accordance with the invention are those obtained by esterifying an unsaturated polybasic acid with a polyhydric alcohol. A fraction of the acid may be replaced by a saturated polybasic acid.

The proportions of the unsaturated polybasic acids, chlorinated derivatives or anhydrides thereof, or mixtures of saturated and unsaturated polycarboxylic acid with polyhydric alcohols, are not critical, and the proportions may be varied to any extent as long as a resinous polyester, preferably having an acid number below 60 is obtained. Polyesters having an acid number between about 5 and 50 are preferred.

The foregoing formulations are condensed by the usual polyester condensation procedure until the acid number is below 50. The reaction mixture is then cooled, and an inhibitor such as hydroquinone, resorcinol, pyrogallol, and an inhibitor such as hydroquinone, resorcinol, pyrogallol, aniline, phenylene diamines, benzaldehyde and the like may be employed. The amount may range in the order of 0.1 to 10% by weight of the resin.

The proportion of fulvene which is employed in conjunction with the unsaturated polyester may range from 5 to 200% by weight of the unsaturated resin. For practical purposes, it has been found that 20 to 100% by weight of the resin is a desirable proportion. Stated in molar amounts, unexpected desirable properties are obtained when the fulvene is in stoichiometric amount with respect to the unsaturade fraction of the polyester. An excess of the fulvene over the unsaturated fraction of the polyester gives softer products, whereas amounts less than stoichiometric amounts with respect to the unsaturated fraction of the polyester gives products which are hard, rigid. If desired, a proportion, such as 5 to 50% monomer, of the fulvene may be replaced by other monomers copolymerizable with the unsaturated polyester, such monomers being illustratively styrene, vinyl toluene, acrylonitrile, diallyl phthalate, methyl methacrylate, ethyl acrylate, and the like. Sometimes, the replacement of part of the fulvene by another copolymerizable monomer is desirable when a smaller proportion of the fulvene is sufficient to give the desired properties.

The polyester resin containing the cross-linking agent or mixtures thereof is cured by the addition of the usual curing catalyst which includes organic peroxides, peracids, hydroperoxides, and the like. Compounds of this type include benzoyl peroxide, lauroyl peroxide, tertiary butyl perbenzoate, 1,1'-hydroperoxy diglycol, hexyl peroxide, methyl ethyl ketone peroxide, tertiary butyl peroxide and the like.

The cured polyester products of the invention are suited for any application where polyesters are used. They are especially suited for structural applications where shrinkage becomes an important element, such as in automobile bodies, luggage and reinforced fiberglass bodies. Also, they may be used for numerous other applications where other polyesters are useful, such as in adhesives, coating compositions, for wood, metals, plastics, or in the treatment of fibrous materials, such as paper, cloth, nonwoven fabrics, as impregnating agents for fibrous materials, as assistants in dyeing and the like.

EXAMPLE I

*Preparation of fulvenes*

To a three-necked 5-liter flask, equipped with a nitrogen inlet tube, reflux condenser, thermometer and dropping funnel, and mechanical stirrer, is added a solution of 383 parts of potassium hydroxide in 1380 ml. of methanol and 764.5 parts of cyclopentadiene, freshly distilled and stored at Dry-Ice acetone temperature. The solution turns a red brown and is allowed to warm to 5° C., at which time 1130 parts of 2-methylpentaldehyde is slowly added. The temperature slowly climbs to 26° C. and at this point the reaction vessel is immersed in an ice bath to control the exothermic reaction, and the remainder of the aldehyde is added so that the temperature never exceeds 26° C. Total addition time is 2 hours and the dark mixture is allowed to stir for an additional one ½ hour at room temperature. The mixture is cooled in an ice bath and neutralizes with glacial acetic acid and an additional 200 ml. of 1 N hydrochloric acid is added. After standing over the weekend, the dark red organic layer is separated from the aqueous layer. The organic layer is washed with water, dried over magnesium sulfate, concentrated under aspirator pressure at room temperature and distilled. The fraction boiling at 40°–48° C./0.5 mm. is collected, 896.7 parts or a 53.5% yield of 2-fulvenylpentane, $n_D^{25}$ 1.4997.

In the following examples, the general procedure of Example I is followed, the reactants and the variables being set forth.

EXAMPLE 2

To 384 parts of cyclopentadiene in a solution of 244 parts of potassium hydroxide in 500 parts of tetrahydrofuran, there is added 244 parts of isobutyraldehyde. The reaction is maintained at 35° C. The product is isolated: it is 6-isopropylfulvene, $n_D^{25}$ 1.5046, boiling point 28°–29° C./0.2 mm.

EXAMPLE 3

There are reacted 500 parts of tetrahydrofuran with 86 parts of cyclopentadiene. The reaction temperature is maintained at 30° C. The product which is isolated is 4-fulvenylcyclohexene, $n_D^{25}$ 1.5514, boiling point 76° C./1.5 mm.

EXAMPLE 4

There are reacted 100 parts of acetone and 66 parts of cyclopentadiene in the presence of 20 parts of sodium hydroxide. The temperature is maintained at 65° C. The product which is isolated is 3-isopropenyl-6,6-dimethylfulvene, $n_D^{25}$ 1.5378, boiling point 47°–50° C./1.25 mm.

EXAMPLE 5

There are reacted 44 parts of di-$\Delta^4$-butenylketone in the presence of 10 parts of potassium hydroxide in 200 parts of tetrahydrofuran with 53 parts of cyclopentadiene. The reaction is maintained at 65° C. The product which is isolated is 6,6-di($\Delta^4$-butenyl)fulvene, $n_D^{25}$ 1.5336, boiling point 73° C./0.25 mm.

EXAMPLE 6

There are reacted 800 parts of a 25% aqueous solution of glutaraldehyde in the presence of 50 parts of potassium hydroxide in a solution in 200 parts of waterethanol with 140 parts of cyclopentadiene. The temperature is maintained at 35° C. The product which is isolated is 6,7-dihydroazulene. Its boiling point is 40° C./2.5 mm.

EXAMPLE 7

126 parts of diacetone alcohol are reacted in the presence of 50 parts of potassium hydroxide with 100 parts of cyclopentadiene. The temperature is maintained at 65° C. The product which is isolated is 6-isobutenyl-6-methylfulvene, $n_D^{25}$ 1.5241, boiling point 68°–71° C./0.4 mm.

EXAMPLE 8

The reaction of 7.645 parts of cyclopentadiene with 1,130 parts of 2-methylpentaldehyde yields 3'-(2''-methylisopentylidene)-2-fulvenylpentane, $n_D^{25}$ 1.5080, boiling point 75° C./0.3 mm.

EXAMPLE 9

*Preparation of Diels-Alder adducts*

To 50 parts of 2-fulvenylpentane and 40 parts of methyl acrylate, there are added 150 parts of xylene and 0.5 part of hydroquinone. The yellow solution is refluxed under nitrogen for 6 hours. The Diels-Alder adduct product is distilled. It has a boiling point of 85°–87° C./0.15 mm., $n_D^{25}$ 1.4794.

The following Table I provides examples of Diels-Alder adducts of various fulvenes with suitable dienophiles. Examples 10–21 show simple Diels-Alder adducts, the addition product of 1 mole of diene and 1 mole of dienophile.

TABLE I

| Example | Fulvene | Dienophile | Boiling Point or Melting Point | Refractive Index 25° C. |
|---|---|---|---|---|
| 10 | 2-fulvenylpentane | Methyl acrylate | 85°–87° C./0.15 mm | 1.4794 |
| 11 | ----do---- | Methyl methacrylate | 95°–97° C./0.7 mm | 1.4764 |
| 12 | 6,6-dimethylfulvene | Maleic anhydride | 135°–137° C. | |
| 13 | ----do---- | Dimethyl acetylenedicarboxylate | 118°–120° C./1.5 mm., 95°–96.5° C. | |
| 14 | ----do---- | Ethyl acrylate | 70° C./0.3 mm | 1.4859 |
| 15 | ----do---- | Methyl methacrylate | 67°–68° C./0.25 mm | 1.4883 |
| 16 | Pentamethylenefulvene | Maleic anhydride | 124°–128° C. | |
| 17 | 6-phenylfulvene | ----do---- | 146°–148° C. | |
| 18 | 6-hexyl-6-methylfulvene | Butyl acrylate | 191°–210° C./0.4 mm | 1.4934 |
| 19 | ----do---- | Dimethyl fumarate | | |
| 20 | 3-isopropenyl-6,6-dimethylfulvene | Dimethyl acetylenedicarboxylate | 150°–170° C./0.5 mm | 1.5282 |
| 21 | 5-isobutenyl-6-methylfulvene | ----do---- | 150°–180° C./0.4 mm | 1.5252 |

The use of two moles of the fulvene with one mole of dienophile gives the double Diels-Alder adduct. Examples 22 to 25 show such typical double Diels-Alder adducts.

TABLE II

| Example | Fulvene | Dienophile | Boiling Point or Melting Point | Refractive Index 25° C. |
|---|---|---|---|---|
| 22 | 2-fulvenylpentane | Methyl acrylate | 161°–165° C./1.5 mm | 1.5083 |
| 23 | ----do---- | Methyl methacrylate | | 1.5085 |
| 24 | 6,6-diphenylfulvene | Azo-bis-isobutyronitrile | 242°–244° C. | |
| 25 | 6,6-dimethylfulvene | Ethyl acrylate | 128°–130° C./0.08 mm | 1.5186 |

Further Diels-Alder adducts are prepared from the respective diene and dienophile to give the products listed in Table III.

TABLE III

Fulvene:
Dimethylfulvene _____ Dioctyl fumarate.
6,6-pentamethylenefulvene ____ Dimethyl fumarate
6-hexyl-6-methylfulvene _____ Maleic anhydrides.
6-hexyl-6-methylfulvene _____ Dimethyl fumarate.
6-hexyl-6-methylfulvene _____ Methacrylic acid.
6-hexyl-6-methylfulvene _____ Acrylic acid.
2-fulvenylpentane _____ Maleic anhydride.
2-fulvenylpentane _____ Dimethyl fumarate.
2-fulvenylpentane _____ Dioctyl fumarate.
2-fulvenylpentane _____ Methacrylic acid.
2-fulvenylpentane _____ Acrylic acid.
6-isopropylfulvene _____ Methacrylic acid.
6-isopropylfulvene _____ Dioctyl fumarate.
6-isopropylfulvene _____ Dimethyl fumarate.
6-isopropylfulvene _____ Maleic anhydride.

EXAMPLE 26

*Polymerization of fulvenes*

To 6 parts of 2-fulvenylpentane there is added 0.4 part of a 50% solution of benzoylperoxide in dibutyl phthalate. The yellow liquid is sealed from the air and heated to a maximum temperature of 140° C. for one hour to give a very viscous red liquid of a molecular weight of 500±10.

EXAMPLE 27

Likewise, the polymer prepared from 6-phenylfulvene with benzoylperoxide had an average molecular weight of 2410±30.

EXAMPLE 28

Likewise, the polymer prepared from 6,6-dimethylfulvene had a molecular weight of 323±8.

EXAMPLE 29

Likewise, a polymer prepared from 6,6-di($\Delta^4$-butenyl)-fulvene had an average weight of 946±5.

EXAMPLE 30

Likewise, a polymer prepared from 4-fulvenylcyclohexene had an average molecular weight of 480±4.

EXAMPLE 31

To 50 parts of dimethyl fumarate there are added 50 parts of 2-fulvenylpentane and 200 parts of xylene. The mixture is refluxed and a total of 0.420 part of di-t-butyl-peroxide in 20 parts of xylene is added over an 8 hour period. The solution is further refluxed and mechanically stirred for an additional 18 hours under nitrogen. The orange solution is concentrated under reduced pressure to give, after distillation of unreacted materials, a polymer of a molecular weight of 534±5.

EXAMPLE 32

Likewise, a copolymer is prepared from 2-fulvenylpentane and styrene. Its average molecular weight is about 850.

EXAMPLE 33

Likewise, a copolymer is prepared from 2-fulvenylpentane and methyl methacrylate. Its molecular weight is about 539.

EXAMPLE 34

Likewise, a copolymer of 2-fulvenylpentane and dimethyl fumarate is prepared having an average molecular weight of about 534.

EXAMPLE 35

Likewise, a copolymer of 2-fulvenylpentane and dimethyl maleate having a molecular weight of 534 is prepared.

EXAMPLE 36

Likewise, a copolymer of 2-fulvenylpentane and butyl acrylate having an average molecular weight of 836 is prepared.

EXAMPLE 37

Likewise, a copolymer of 6-hexyl-6-methylfulvene and dimethyl fumarate having a molecular weight of 739 to 1077 is prepared.

EXAMPLE 38

A polymer of a Diels-Alder adduct is obtained by adding to 5 parts of the Diels-Alder adduct of 6,6-dimethylfulvene and maleic anhydride, exo-7-isopropenylbicyclo-(2.2.1)hept-5-ene-2,3-dicarboxylic anhydride, a catalytic amount of benzoyl peroxide. The mixture is heated to 170° C., an orange oil is formed which turns into an orange glass on cooling. It is soluble in chloroform and has a softening point above 250° C. (from acetone). Its molecular weight is about 699.

EXAMPLE 39

To a 3-necked, 1-liter flask, equipped with an addition funnel, mechanical stirrer, thermo-couple well, nitrogen inlet, and reflux condenser, there are added 400 parts of an unsaturated polyester, a poly(dipropylene fumarate), heating is started and at about 80° C. stirring is initiated, nitrogen being flushed throughout. To the stirred polyester, there are added 138 parts of 2-fulvenylpentane containing 0.1 part of quinone over a one hour period. After adding, the light yellow liquid is stirred for an additional one-half hour. A viscous blend of the unsaturated polyester and the fulvene compounds, chemically combined in a Diels-Alder type addition, is obtained.

Increasing the proportion of the fulvenes over the stoichiometric amount of unsaturation in the polyester gives stable poly Diels-Alder blends which are less viscous.

Castings are prepared from the Diels-Alder blends of polyester and fulvene by heating the blends above 100° C., the cross-linking reaction occurring within the temperature range of 100° C. to 200° C. The products are colored yellow to dark brown. The castings are completely insoluble in water, hexane, chloroform, acetone, and acetonitrile.

EXAMPLE 40

The poly Diels-Alder adduct of the unsaturated polyester and the fulvene prepared in Example 39 are cross-linked by heating the viscous yellow blend for a 24 hour period in a polyester curing cycle from 50° to 140° C. and back again. A yellow glass is obtained.

Other fulvene resins are prepared from various unsaturated polyester resins and other typical fulvenes of the invention to give the Diels-Alder adduct blend and subsequently upon heating the cross-linked resin. Typical of such polyester resins that are prepared are the following, the proportion of fulvenes to polyester resin being expressed on a weight ratio basis.

TABLE IV

| Example | Polyester | Fulvene | Fulvene/Polyester Weight Ratio | Description |
|---|---|---|---|---|
| 41 | Poly(dipropylenefumarate) | Fulvenylpentane | 41/59 | Orange glass. |
| 42 | do | do | 50/50 | Viscous orange liquid. |
| 43 | do | do | 60/40 | Semi-viscous orange liquid. |
| 44 | Poly(Propylenephthalatefumarate) | do | 29/71 | Orange glass. |
| 45 | do | do | 40/60 | Do. |
| 46 | do | do | 50/50 | Viscous orange liquid. |
| 47 | Poly(dipropylenefumarate) | 6-isopropylfulvene | 36/63 | Very viscous yellow liquid. |
| 48 | do | do | 50/50 | Viscous orange liquid. |
| 49 | do | do | 59/41 | Orange liquid. |
| 50 | Poly(propylenephthalatefumarate) | do | 25/75 | Yellow glass. |
| 51 | do | do | 40/60 | Orange glass. |
| 52 | do | do | 60/40 | Viscous orange liquid. |
| 53 | Poly(dipropylenefumarate) | 6,6-dimethylfulvene | 33/67 | Yellow glass. |
| 54 | do | do | 40/60 | Do. |
| 55 | do | do | 50/50 | Orange viscous liquid. |
| 56 | Poly(propylenephthalatefumarate) | do | 23/77 | Yellow glass. |
| 57 | do | do | 40/60 | Do. |
| 58 | do | do | 50/50 | Viscous yellow liquid. |
| 59 | do | 6-hexyl-6-methylfulvene | 33/67 | Yellow glass. |
| 60 | do | do | 40/60 | Yellow orange glass. |
| 61 | do | do | 50/50 | Viscous orange liquid. |

TABLE V.—POLYESTER RESIN

| Example No. | Unsaturated Anhydride Component | Unsaturated Acid Component | Saturated Acid Component | Glycol Component | Fulvene Component |
|---|---|---|---|---|---|
| 62 | (19) Maleic | | (28) Adipic | (29) Propylene | (24) 6-phenylfulvene. |
| 63 | (16) Maleic | | (33) Sebacic | (35) Diethylene | (16) 6-phenylfulvene. |
| 64 | (30) Mesaconic acid | | | (30) Dipropylene | (41) 6,6-di(Δ¹-butenyl-fulvene). |
| 65 | (10) Maleic | | | (21) Dipropylene | (59) 6,6-di(Δ¹-butenyl-fulvene). |
| 66 | (16) Maleic | | (9) Terephthalic | (43) Dipropylene | (21) 4-fulvenyl-cyclohexane. |
| 67 | (29) Maleic | (20) Mesaconic | | (11) Propylene | (40) 4-fulvenyl-cyclohexane. |
| 68 | (27) Maleic | | | (20) Dipropylene | |
| 69 | (19) Maleic | | | (33) Hexamethylene | (40) 6-isobutenyl-6-methylfulvene. |
| 70 | (11) Maleic | | (20) Succinic | (54) Dipropylene | (7) 6-isobutenyl-6-methylfulvene. |
| 71 | (6) Maleic | | (36) Isophthalic | (35) Diethylene | (18) 3-isopropenyl-6-6-dimethylfulvene. |
| 72 | (6) Maleic | | (40) Adipic | (19) Ethylene | (35) 3-isopropenyl-6-6-dimethylfulvene. |
| 73 | (41) Fumaric acid | | (54) Adipic | (33) Propylene | (7) 6,6-dimethylfulvene. |
| 74 | (13) Citraconic acid | | | (22) Ethylene | (37) 6,6-dimethylfulvene. |
| 75 | (17) Fumaric acid | | (37) Azelaic | (27) 1,3-butylene | (23) 6-isopropylfulvene. |
| | | | (24) 2,5-endo-methylene hexahydrophthalic anhydride. | (40) p-Xylylene | (19) 6,7-dihydroazulene. |
| 76 | (18) Maleic | | (27) Phthalic anhydride. | (21) Ethylene<br>(2) Trimethylol propane. | (32) 6-methyl-6-hexylfulvene. |

NOTE.—In parenthesis, there is given the mole percent of each component in the polyester resin.

We claim:

1. A stable, polymerizable composition comprising a linear, unsaturated polyester which is a resinous condensation reaction product of unsaturated dibasic acids and saturated acids, or anhydrides of said acids, and polyhydric alcohols and a fulvene of the formula

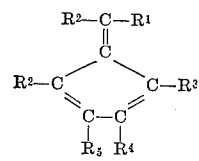

in which
(1) $R^1$ to $R^6$, when selected individually, are selected from the group consisting of a hydrocarbon atom, a hydrocarbon group, and a substituted hydrocarbon group substituted with inert substituents; and
(2) one of $R^1$ and $R^2$ is a substituent selected from the group consisting of a hydrogen atom and a hydrocarbon group while the other substituent of $R^1$ and $R^2$ is linked to one of the substituents $R^3$ to $R^6$ to form a divalent alkylene chain forming cycloalkylene ring having 4 to 10 carbon atoms; said fulvene being in a Diels-Alder combination with at least one of the ethylenic bonds in the unsaturated polyester backbone.

2. The stable, polymerizable composition of claim 1 in which $R^1$ and $R^2$ are each one a substituents selected from the group consisting of a hydrogen atom, an alkyl, aryl, alkaryl, and aralkyl group.

3. The composition of claim 1 in which the proportion of the fulvene is at least equimolar respecting the unsaturated component of the polyester.

4. The composition of claim 1 in which in the formula of the fulvene $R^1$ and $R^2$ are each an alkyl group and $R^3$ to $R^6$ are each an alkyl group.

5. The stable, polymerizable, fluid, resinous composition of claim 1, in which in said fulvene
   (1) one of the substituents $R^1$ and $R^2$ is a hydrogen atom and the other of $R^1$ and $R^2$ is an alkyl group which is alkyl-substituted on its α-carbon atom;
   (2) $R^1$ and $R^2$ are both an aryl group of 6 to 14 carbon atoms and at least one of the substituents $R^3$ to $R^6$ is a branched alkylene group;
   (3) at least one of the substituents $R^1$ and $R^2$ is an alkylene group with terminal ethylenic unsaturation and $R^3$ to $R^6$ is selected from a group consisting of a hydrogen atom and a hydrocarbon group, and
   (4) one of the substituents $R^1$ and $R^2$ is a hydrogen atom and one of the other substituents of $R^1$ and $R^2$ is linked to one of the substituents $R^3$ to $R^6$ to form a cycloalkylene carbocycle.

6. The composition of claim 1 in which in the formula of the fulvene one of the substituents $R^1$ and $R^2$ is a hydrogen atom and the other substituent is an alkyl group.

7. The composition of claim 1 in which the fulvene is 2-fulvenylpentane.

8. The composition of claim 1 in which the fulvene is 6-isopropylfulvene.

9. The composition of claim 1 in which the fulvene is 6-cyclohex-9-enyl fulvene.

10. The composition of claim 1 in which the fulvene is 3-isopropenyl-6,6-dimethylfulvene.

11. The composition of claim 1 in which the fulvene is 6,6-di-4-butenylfulvene.

12. The composition of claim 1 in which the fulvene is 6-isobutenyl-6-methylfulvene.

13. A plastic composition comprising the cured and crosslinked product of claim 1.

14. The composition of claim 13 wherein in said fulvene of the formula

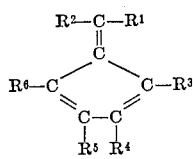

(1) one of the substituents $R^1$ and $R^2$ is a hydrogen atom and the other of $R^1$ and $R^2$ is an alkyl group which is alkyl substituted on its α-carbon atom;
   (2) $R^1$ and $R^2$ are both an aryl group of 6 to 14 carbon atoms and at least one of the substituents $R^3$ to $R^6$ is a branched alkylene group;
   (3) at least one of the substituents $R^1$ and $R^2$ is an alkylene group with terminal ethylenic unsaturation and $R^3$ to $R^6$ being selected from a group consisting of a hydrogen atom and a hydrocarbon group, and
   (4) one of the substituents $R^1$ and $R^2$ is a hydrogen atom and one of the other substituents of $R^1$ and $R^2$ is linked to one of the substituents $R^3$ to $R^6$ to form a cycloalkylene carbocycle.

15. The composition of claim 13 wherein in said fulvene of the formula

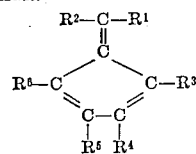

(1) one of the substituents $R^1$ and $R^2$ is selected from a group consisting of a hydrogen atom and an alkyl group and the other substituent of $R^1$ and $R^2$ is an alkyl group which is alkyl-substituted on its α-carbon atom and in which
   (2) the substituents $R^3$ and $R^6$ are selected from a group consisting of a hydrogen atom and a hydrocarbon group.

16. The composition of claim 13 in which the fulvene is selected from a group consisting of 6-α-methylbutylfulvene, 6-isopropylfulvene, 6-cyclohex-8-enyl fulvene, 3-isopropenyl-6,6-dimethylfulvene, 6,6-di-4-butenylfulvene, and 6-isobutenyl-6-methylfulvene.

17. A process which comprises reacting a composition comprising a fulvene of the formula

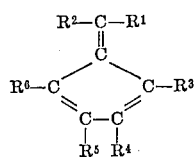

in which
   (1) $R^1$ to $R^6$, when selected individually, are selected from the group consisting of a hydrocarbon atom, a hydrocarbon group, and a substituted hydrocarbon group substituted with inert substituents; and
   (2) one of $R^1$ and $R^2$ is a substituent selected from the group consisting of a hydrogen atom and a hydrocarbon group while the other substituent of $R^1$ and $R^2$ is linked to one of the substituents $R^3$ to $R^6$ to form a divalent alkylene chain forming cycloalkylene ring having 4 to 10 carbon atoms to form a Diels-Alder chemical combination with at least one of the ethylenically unsaturated bonds of an unsaturated polyester which is a resinous condensation reaction product of unsaturated dibasic acids, mixtures of unsaturated dibasic acids, or anhydrides of said acids, and polyhydric alcohols.

18. A process which comprises reacting the fulvene defined in claim 17 to form a Diels-Alder chemical combination with at least one of the ethylenically unsaturated bonds of an unsaturated polyester which is a resinous condensation reaction product of unsaturated dibasic acids and saturated acids, or anhydrides of said acids, and polyhydric alcohols and heating until the fulvene is crosslinked with the unsaturated polyester to give a cross-linked plastic product.

19. The process of claim 17 in which the composition comprises in addition to the fulvene 5% to 50% of a monomer copolymerizable with the unsaturated polyester.

References Cited by the Examiner

UNITED STATES PATENTS

| | | | |
|---|---|---|---|
| 2,512,698 | 6/1950 | Thompson et al. | 260—88.1 |
| 2,628,955 | 2/1953 | Parrish | 260—88.1 |
| 2,884,398 | 4/1959 | Thomas et al. | 260—871 |

FOREIGN PATENTS 1,083,542  6/1960  Germany.

MURRAY TILLMAN, *Primary Examiner.*

J. T. GOOLKASIAN, *Assistant Examiner.*